Sept. 26, 1933.  G. JOHNSON  1,928,592
SNAP FASTENER STUD
Filed April 27, 1931
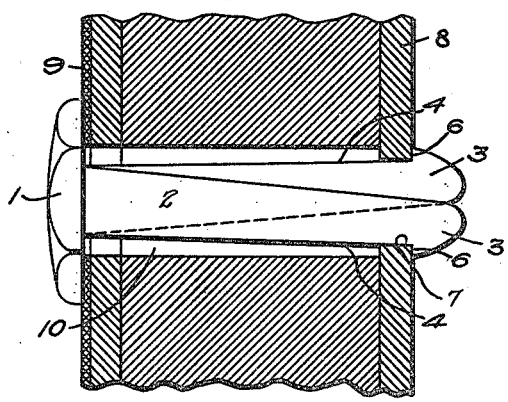
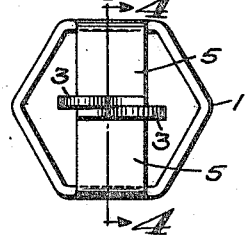
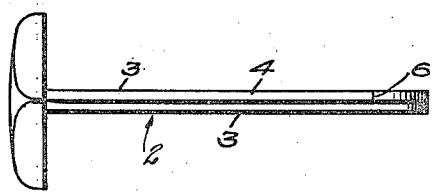
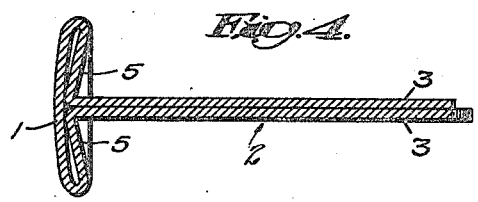
Inventor:
Gustav Johnson
By Emery, Booth, Varney & Townsend
Attys Patented Sept. 26, 1933

1,928,592

UNITED STATES PATENT OFFICE 1,928,592

SNAP FASTENER STUD

Gustav Johnson, West Roxbury, Mass., assignor to United-Carr Fastener Corporation, Cambridge, Mass., a corporation of Massachusetts Application April 27, 1931. Serial No. 533,039

4 Claims. (Cl. 85—5)

My invention aims to provide improvements in snap fastener studs.

In the drawing which illustrates a preferred embodiment of my invention:—

Figure 1 is a section through an installation showing one use of my improved stud member;

Fig. 2 is an end view of the stud shown in Figure 1;

Fig. 3 is an edge view of the snap fastener stud; and

Fig. 4 is a section taken on the line 4—4 of Fig. 2.

In the annexed drawing I have shown a preferred embodiment of my improved fastener stud (Figure 1) in connection with securing a padding, upholstery, or the like to the "dash" or other part of a motor vehicle or the like. Stud members for certain uses must be provided with relatively long shanks which cannot be drawn or pressed from a sheet metal blank in the manner of the ordinary snap fastener stud. Therefore, I have provided a stud which is formed from sheet metal and the shank is folded from the blank. My improved fastener is also useful if made in various lengths.

The particular stud member illustrated is formed from a single piece of metal and has a base 1 and a shank 2. The shank is formed by two opposed flat, yieldable projections 3. Each projection 3 extends from the base 1 at right angles to the general plane of the base, as shown in Figure 1, and overlaps the other. The projections 3 have edges 4—4 which diverge with relation to each other to grip a socket when engaged therewith. The stud is of the yieldable type for engagement with a rigid socket means and, therefore, it is desirable to have as stiff a snapping action and holding power as the ordinary short shank stud. Therefore, I have formed the projections 3 in such a manner that they extend from the free ends of yieldable portions 5—5 extending toward the center of the base from the periphery thereof. When the projections 3—3, forming the shank, are squeezed to permit the shoulders 6—6 to pass through the aperture 7 in the part 8 the portions 5—5 (Fig. 2) yield by a twisting action. After the shoulders pass through the aperture 7 the projections are returned to their normal positions by the tendency of the portions 5—5 to return to flat positions, thereby engaging the shoulders 6—6 behind the part 8, as best shown in Figure 1.

The base 1 is in the form of an imperforate cup-shaped portion and the yieldable portions 5—5 extend toward each other from the edge of the cup-shaped portion downwardly into the hollow of the base. Therefore, when the portions 5—5 yield, their movement is confined within the hollow of the base and there is no interference with the operation of the fastener when being engaged with, or disengaged from the installation. As an example, if we assume that the stud is attached to an installation such as shown in Figure 1, the projections 3 may be moved toward each other without interference between the yieldable portions 5—5 and the face of the material 9. If the portions 5—5 rested against the face of the portion 9 it would be apparent that the twisting, yielding action of the portions 5—5 would be interfered with and it would be difficult to remove the stud member.

In the installation of the fastener stud (Figure 1) I have shown the shouldered end of the shank as being snapped through an aperture 7 in a sheet metal portion 8 and the shank passing through an aperture 10 in the padding or upholstery which is held in place by the base 1 of the fastener as it bears against the outer face.

While I have illustrated and described a preferred embodiment of my invention, I do not wish to be limited thereby, because the scope of my invention is best defined by the following claims.

I claim:

1. A snap fastener stud having a base, a pair of yieldable portions extending from opposite edges to said base toward each other beneath said base and having their inner ends terminating adjacent to each other near the center of said base, a flat projection extending from each of said yieldable portions adjacent the center of said base, said flat projections extending away from said base at substantially right angles thereto and being located close to each other in a scissors-like relationship, said flat projections having narrow edges shaped to make snap fastening engagement with co-operating socket means and adapted to be moved laterally relative to each other and in parallel planes by the adaptability of said yieldable portions to twist relative to each other when said projections are forced into engagement with co-operating socket means.

2. A snap fastener stud having a cup-shaped base provided with an imperforate bottom portion, a pair of flat projections extending from said base and arranged with their flat faces toward and close to each other, each of said projections having a narrow edge diverging from said base with relation to the other and cooperating to provide the means for engagement with a cooperating socket to secure the stud thereto and yieldable portions connecting said projections to the edge of said base, said yieldable portions being spaced from said base thereby to permit movement of one projection relative to the other by a torsional movement of said yieldable portions when the stud is being engaged with or disengaged from cooperating fastening means.

3. A snap fastener stud having a cup-shaped base, a pair of flat projections extending from said base and arranged with their flat faces toward each other, each of said projections having an edge diverging from said base with relation to the other and yieldable means connecting said projections to said base and adapted to permit movement of one projection relative to the other when the stud is being engaged with or disengaged from cooperating fastening means, said yieldable means extending from the periphery of said cup-shaped base into the hollow and toward the bottom thereof.

4. A one-piece sheet metal snap fastener stud having a cup-shaped base 1, two yieldable portions 5—5 extending from the edge of the base toward each other and a flat projection 3 extending from the free end of each yieldable portion, said projections 3—3 normally overlapping each other and having fastener socket engaging edges movable laterally relative to each other and in parallel planes, and said yieldable portions 5—5 being adapted to be twisted to permit the said movement of said projections.

GUSTAV JOHNSON.